US006937439B1

(12) United States Patent
Chang et al.

(10) Patent No.: US 6,937,439 B1
(45) Date of Patent: Aug. 30, 2005

(54) SLIDER HAVING A TEXTURED AIR BEARING SURFACE, HEAD STACK ASSEMBLY AND DISK DRIVE USING SAME

(75) Inventors: Ciuter Chang, Fremont, CA (US); Jih-Ping Peng, Cupertino, CA (US); Ming-Ching Tang, Saratoga, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/010,672

(22) Filed: Nov. 30, 2001

(51) Int. Cl.[7] ................................................ G11B 5/60
(52) U.S. Cl. ................................ 360/235.8; 360/236.3
(58) Field of Search .......................... 360/235.8, 235.6, 360/236, 236.3, 236.4, 237, 236.6

(56) References Cited

U.S. PATENT DOCUMENTS

| | | | | |
|---|---|---|---|---|
| 5,267,104 | A * | 11/1993 | Albrecht et al. | 360/97.02 |
| 5,285,337 | A * | 2/1994 | Best et al. | 360/97.02 |
| 5,499,149 | A * | 3/1996 | Dovek | 360/234.1 |
| 5,768,055 | A * | 6/1998 | Tian et al. | 360/235.2 |
| 5,777,825 | A * | 7/1998 | Dorius | 360/235.6 |
| 6,130,808 | A * | 10/2000 | Yotsuya | 360/235.4 |
| 6,212,042 | B1 * | 4/2001 | Gui et al. | 360/236.6 |
| 6,229,671 | B1 * | 5/2001 | Boutaghou et al. | 360/235.1 |
| 6,236,543 | B1 * | 5/2001 | Han et al. | 360/236.6 |
| 6,304,418 | B1 * | 10/2001 | Boutaghou et al. | 360/236.6 |
| 6,349,018 | B2 * | 2/2002 | Koishi et al. | 360/236.3 |
| 6,351,345 | B1 * | 2/2002 | Kameyama | 360/236.3 |
| 6,392,842 | B1 * | 5/2002 | Boutaghou et al. | 360/236.6 |
| 6,396,661 | B1 * | 5/2002 | Yokohata et al. | 360/135 |
| 6,483,667 | B1 * | 11/2002 | Berg et al. | 360/235.6 |
| 6,483,668 | B2 * | 11/2002 | Hipwell et al. | 360/235.9 |
| 6,490,136 | B1 * | 12/2002 | Ito et al. | 360/236.4 |
| 6,507,458 | B1 * | 1/2003 | Miyagawa | 360/237 |
| 6,529,346 | B2 * | 3/2003 | Otsuka | 360/235.8 |
| 6,538,849 | B1 * | 3/2003 | Fayeulle et al. | 360/236.3 |
| 2001/0043559 | A1 * | 11/2001 | Schaenzer et al. | 369/300 |
| 2002/0008939 | A1 * | 1/2002 | Boutaghou et al. | 360/235.8 |
| 2002/0008940 | A1 * | 1/2002 | Jang et al. | 360/236.3 |

FOREIGN PATENT DOCUMENTS

WO WO 00/68940 * 11/2000

* cited by examiner

*Primary Examiner*—Brian E. Miller
(74) *Attorney, Agent, or Firm*—Young Law Firm

(57) ABSTRACT

A disk drive includes a disk having a recording surface and a head stack assembly. The head stack assembly includes a body portion that includes a bore defining a pivot axis, an actuator arm cantilevered from the body portion and a head gimbal assembly supported at the actuator arm. The head gimbal assembly includes a load beam, a gimbal coupled to the load beam and a slider coupled to the gimbal, the slider including a transducer for reading and writing on the recording surface. The slider includes an air bearing surface that is configured to form a shallow recessed surface and a deep recessed surface. The air-bearing surface includes a leading air bearing region and one or more insular regions configured to reduce stiction with the disk. The shallow recessed surface is disposed between the air bearing surface and the deep recessed surface.

27 Claims, 6 Drawing Sheets

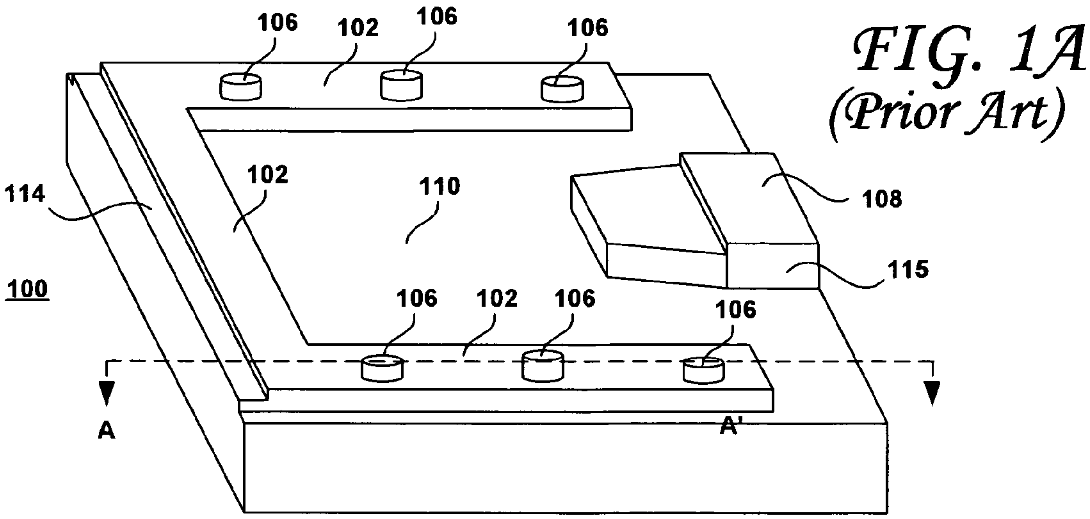
FIG. 1A
(Prior Art)
FIG. 1B
(Prior Art)
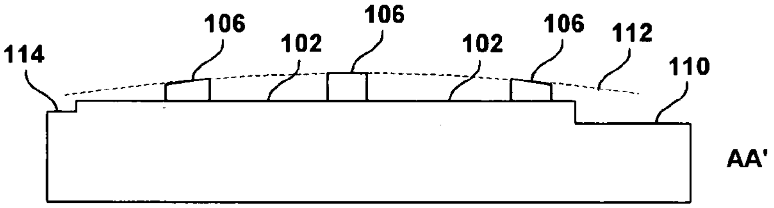
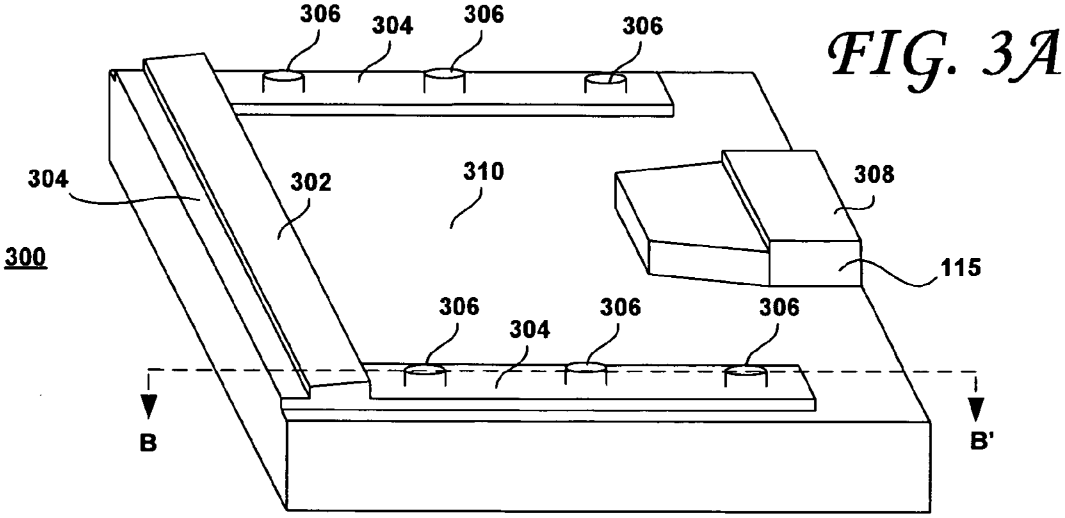
FIG. 3A
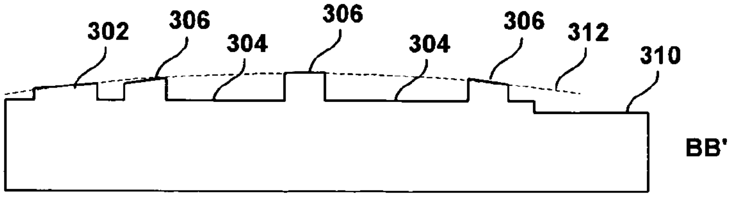
FIG. 3B

SLIDER HAVING A TEXTURED AIR BEARING SURFACE, HEAD STACK ASSEMBLY AND DISK DRIVE USING SAME

BACKGROUND OF THE INVENTION

1. Field of the Invention

The present invention relates to disk drives. More particularly, the present invention relates to air-bearing sliders that include a textured air-bearing surface (ABS) and to head stack assemblies and disk drives that include such an air-bearing slider.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the slider toward the disk; and (3) a flex cable assembly that provides an electrical interconnect with minimal constraint on movement.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. The slider is said to be "flying" over the disk when in this state.

Padded sliders have been extensively used to improve the stiction problem (the tendency of facing and contacting highly polished flat surfaces to stick to one another) at the interface between the head and the disk during drive operation. FIG. 1A is a perspective view of a conventional padded slider 100. FIG. 1B is a cross-sectional view of the padded slider 100 of FIG. 1A, taken along cross-sectional line AA'. Considering now FIGS. 1A and 1B collectively, the padded slider 100 may be formed of a block of aluminum titanium carbide. The slider 100 includes an Air Bearing Surface (hereafter, ABS) 102. A shallow etch surface 114 is etched from the ABS 102 toward the leading edge of the padded slider 100. A deep etch surface 110 is etched from the ABS 102. A center pad 108 to which the slider's read/write transducer is attached is disposed on the trailing edge of the padded slider 100. As shown, the shallow etch surface 114 is disposed between the ABS 102 and the deep etch surface 110. The conventional padded slider 100 also includes a plurality of protuberances 106 that protrude from the ABS 102. The protuberances 106 are pads that are configured to minimize the stiction between the surface of the disk and the slider 100. The plurality of protuberances 106 rise away from the ABS 102 such that their free end is further away from both the shallow etch surface 114 and the deep etch surface 110 than is the ABS 102. The conventional padded slider 100, therefore, has a topology that defines at least four discrete levels: an ABS 102, protuberances 106, a shallow etch surface 114 and a deep etch surface 110. The protuberances 106 are typically formed by a separate carbon deposition process that forms the pillar-shaped structures 106. As most easily seen in FIG. 1B, the free ends of protuberances 106 of a conventional padded slider 100 may collectively form a slight radius of curvature 112, which is exaggerated in FIG. 1B for clarity of illustration.

Such conventional padded sliders have a number of disadvantages, including the separate process step required to form the plurality of protuberances 106, some limitations on the placement of such discretely-deposited protuberances and the high flying pitch of the slider. The high flying pitch of the conventional slider 100 is of particular concern, as it significantly degrades the flying performance of the head, including poor Take Off Velocity (TOV) and contributes to poor vertical pitch and roll stiffness, poor flyability and like disadvantages.

What are needed, therefore, are sliders that do not suffer from the high flying pitch disadvantages inherent in conventional padded sliders and that do not require an extra process step to deposit the stiction minimizing protuberances 106. What are also needed are head stack assemblies and disk drives incorporating such improved sliders.

SUMMARY OF THE INVENTION

Accordingly, this invention may be regarded as a head stack assembly for a disk drive having a disk, the head stack assembly including a body portion including a bore defining a pivot axis, an actuator arm cantilevered from the body portion and a head gimbal assembly supported at the actuator arm. The head gimbal assembly includes a load beam, a gimbal coupled to the load beam, and a slider coupled to the gimbal and including a transducer for reading and writing on a recording surface of a disk. The slider includes an air bearing surface that is configured to form a shallow recessed surface and a deep recessed surface. The air-bearing surface includes a leading air bearing region and one or more insular regions configured to reduce stiction with the disk. The shallow recessed surface is disposed between the air bearing surface and the deep recessed surface.

The air-bearing surface may be selectively etched to form the shallow recessed surface and/or the deep recessed surface. The insular region(s) may be formed by selectively etching the air-bearing surface. The insular region(s) may be bounded by the shallow recessed surface or by the deep recessed surface, for example. The insular region(s) may be substantially co-planar with the leading air bearing region. According to one embodiment of the present invention, the height differential between the insular region(s) of the air bearing surface and the leading air bearing region is less than 4 micro inches. The air-bearing surface may be curved such that the leading air-bearing region and the insular region(s) collectively form a radius of curvature. The air-bearing surface, according to another embodiment of the present invention, includes a plurality of insular regions, each of the plurality of insular regions being shaped and dimensioned so as to reduce stiction with the disk. The air-bearing surface may further include a center pad region disposed near a trailing edge of the slider. The insular region(s) of the air-bearing surface may take most any shape, such as a circle or an ellipse, for example. Each of the insular region(s) may be chosen to have surface area that is greater than 100 microns squared and less than 2000 microns squared. The slider may further include a layer of diamond like carbon deposited on the insular region(s) and/or the leading air-bearing region of the air bearing surface, the shallow recessed surface and/or the deep recessed surface.

The present invention may also be viewed as a disk drive comprising a disk having a recording surface; a head stack assembly, including: a body portion including a bore defining a pivot axis; an actuator arm cantilevered from the body portion and a head gimbal assembly supported at the actuator arm. The head gimbal assembly includes a load beam; a gimbal coupled to the load beam, and a slider coupled to the gimbal and including a transducer for reading and writing on the recording surface. The slider includes an air-bearing surface that is configured to form a shallow recessed surface and a deep recessed surface, the air-bearing surface including a leading air bearing region and at least one insular region configured to reduce stiction with the disk. The shallow recessed surface is disposed between the air bearing surface and the deep recessed surface.

The present invention may also be viewed as a slider for a disk drive including a disk, the disk including a recording surface. The slider includes a transducer for reading and writing on the recording surface, and an air bearing surface that is configured to form a shallow recessed surface and a deep recessed surface, the air bearing surface including a leading air bearing region and at least one insular region configured to reduce stiction with the disk, the shallow recessed surface being disposed between the air bearing surface and the deep recessed surface.

The foregoing and other features of the invention are described in detail below and set forth in the appended claims.

BRIEF DESCRIPTION OF THE DRAWINGS

FIG. 1A is a representation of a conventional slider.

FIG. 1B is a cross-sectional view of the slider of FIG. 1A, taken along line AA'.

FIG. 3A is a representation of a slider according to an embodiment of the present invention.

FIG. 3B is a cross-sectional view of the slider of FIG. 3A, taken along line BB'.

DESCRIPTION OF THE PREFERRED EMBODIMENTS

Figure 2:
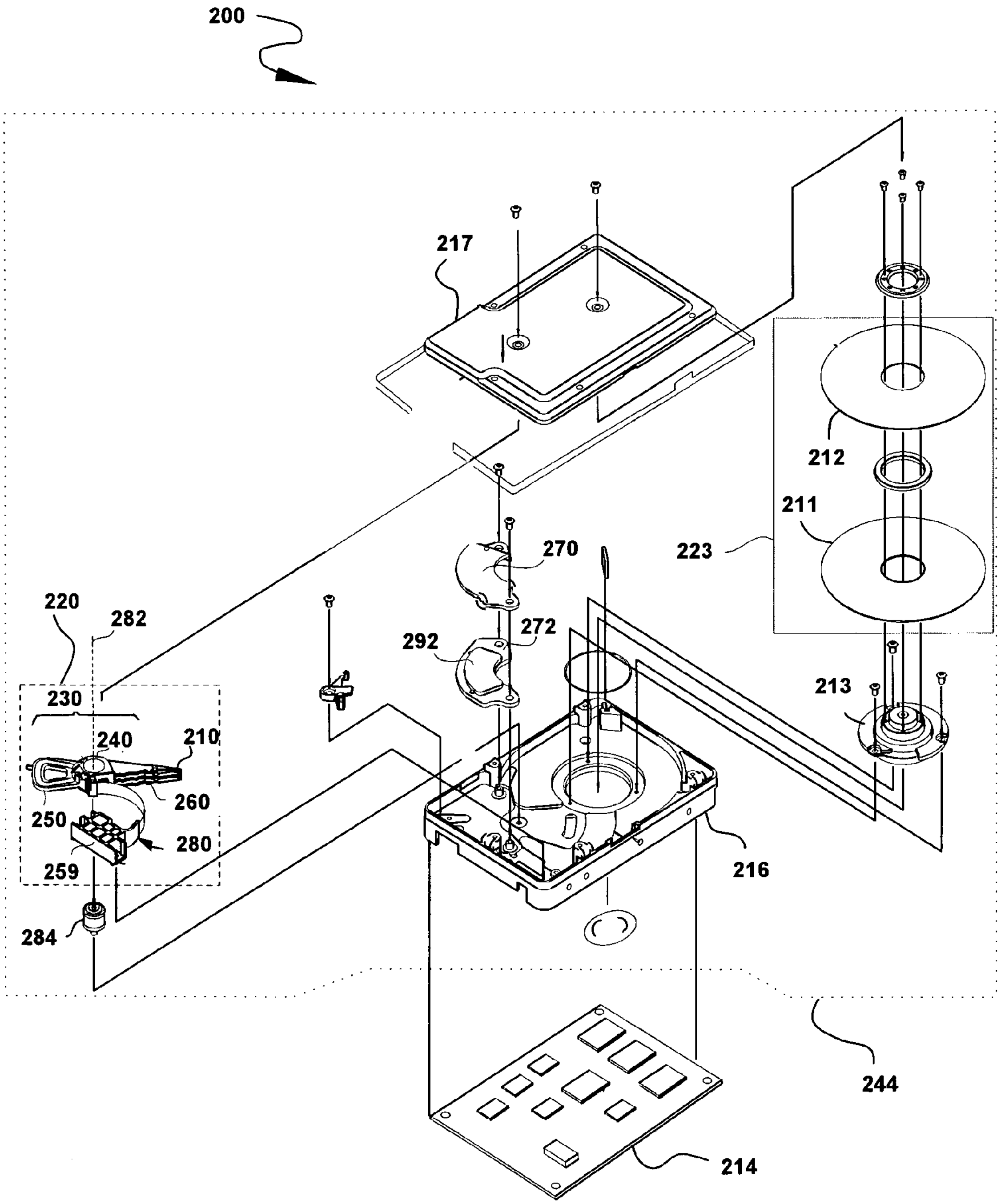
FIG. 2 is an exploded view of a disk drive according to the present invention.
Figure 6:
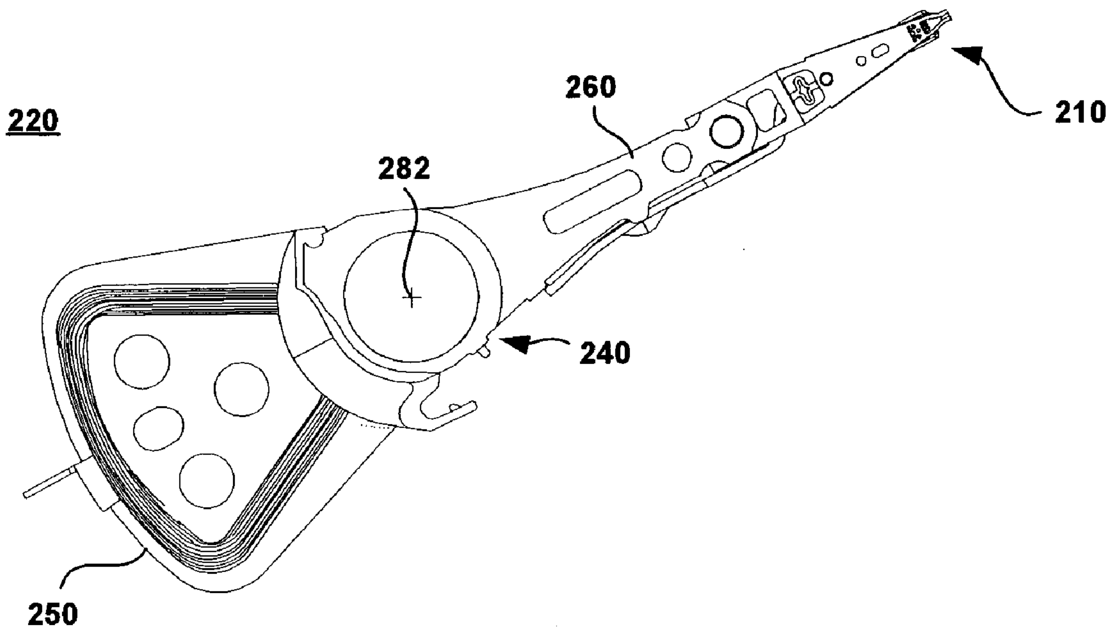
FIG. 6 is a plan view of a head stack assembly, according to an embodiment of the present invention. For clarity, the head stack assembly is shown in FIG. 6 without the flex circuit cable assembly.

FIG. 2 shows the principal components of a magnetic disk drive 200 constructed in accordance with the present invention. With reference to FIG. 2, the disk drive 200 is an Integrated Drive Electronics (IDE) drive comprising a HDA 244 and a PCBA 214. The HDA 244 includes a base 216 and a cover 217 attached to the base 216 that collectively house a disk stack 223 that includes a plurality of magnetic disks (of which only a first disk 211 and a second disk 212 are shown in FIG. 2), a spindle motor 213 attached to the base 216 for rotating the disk stack 223, an HSA 220, and a pivot bearing cartridge 284 (such as a stainless steel pivot bearing cartridge, for example) that rotatably supports the HSA 220 on the base 216. The spindle motor 213 rotates the disk stack 223 at a constant angular velocity. As also shown in FIG. 6, the HSA 220 comprises a swing-type or rotary actuator assembly 230, at least one HGA 210, and a flex circuit cable assembly 280. The rotary actuator assembly 230 includes a body portion 240, at least one actuator arm 260 cantilevered from the body portion 240, and a coil portion 250 cantilevered from the body portion 240 in an opposite direction from the actuator arm 260. The actuator arm 260 supports the HGA 210 that, in turn, supports the slider(s) according to the present invention. The flex cable assembly 280 may include a flex circuit cable and a flex clamp 259. The HSA 220 is pivotally secured to the base 216 via the pivot-bearing cartridge 284 so that the present slider at the distal end of the HGA 210 may be moved over the surfaces of the disks 211, 212. The pivot-bearing cartridge 284 enables the HSA 220 to pivot about a pivot axis, shown in FIGS. 2 and 6 at reference numeral 282. The storage capacity of the HDA 244 may be increased by including additional disks in the disk stack 223 and by an HSA 220 having a vertical stack of HGAs 210 supported by multiple actuator arms 260.

The "rotary" or "swing-type" actuator assembly comprises a body portion 240 that rotates on the pivot bearing 284 cartridge between limited positions, a coil portion 250 that extends from one side of the body portion 240 to interact with one or more permanent magnets 292 mounted to back irons 270, 272 to form a voice coil motor (VCM), and an actuator arm 260 that extends from an opposite side of the body portion 240 to support the HGA 210. The VCM causes the HSA 220 to pivot about the actuator pivot axis 282 to cause the present sliders that include the read write transducers of the HSA 220 to sweep radially over the disk(s) 211, 212.

The HGA 210 includes a load beam and a gimbal coupled to the load beam. The slider of the present invention is coupled to the gimbal and includes a transducer for reading and writing on a recording surface of a disk. In one embodiment, the transducer may include a magneto-resistive ("MR") element for reading, such as a GMR element, and an inductive element for writing. An embodiment of a slider according to the present invention, such as may be coupled to the HGA 210 in FIGS. 2 and 6, is shown in FIGS. 3A and 3B. FIG. 3A is a representation of a textured slider according to an embodiment of the present invention. FIG. 3B is a cross-sectional view of the slider of FIG. 3A, taken along cross-sectional line BB'. As shown, the slider 300 includes an air bearing surface, a shallow recessed surface 304 and a deep recessed surface 310. The air-bearing surface includes a leading air bearing region 302 disposed near the leading edge of the slider 300 and one or more insular regions 306 that are configured to reduce stiction with the disk. The air-bearing surface may also include a center pad 115 that defines a center pad region 308 disposed near the trailing edge of the slider 300. The air-bearing surface of the slider 300 of the present invention, therefore, is comprised of a plurality of constituent regions, as shown by the regions referenced at 302, 306 and 308. In this manner, the air-bearing surface of the slider 300 may be termed a "textured" air-bearing surface, as the air-bearing surface has been configured (etched, for example) to include a plurality of discrete regions, such as shown at reference numerals 302, 306 and 308.

The air-bearing surface 302, 306, 308 may be selectively etched to form the shallow recessed surface 304 and the deep recessed surface 310. According to the present invention, the shallow recessed surface 304 is disposed between the air bearing surface and the deep recessed surface 310. The etching step (or other texturing, patterning or forming step) that forms the shallow etch surface 304 may also form the insular regions 306. Indeed, according to an embodiment of the present invention, the air-bearing surface is selectively etched (using appropriate known masking and/or collimating techniques, for example) according to various patterns and to various depths so as to form the shallow etch region 304, the deep etch region 310 and so to leave the insular regions 306 bounded by the shallow etch region 304, as shown in FIGS. 3A and 3B. As it is the leading air bearing region 302, the insular regions 306 and the center pad region 308 of the center pad 115 that collectively form the air-bearing surface of the slider 300, the insular regions 306 themselves cannot protrude therefrom (because they are the air bearing surface). In turn, this configuration of the air-bearing surface lowers increases the vertical pitch and roll stiffness and lowers the flying pitch of the slider 300, as compared to the conventional slider shown in FIGS. 1A and 1B.

Figure 4A:
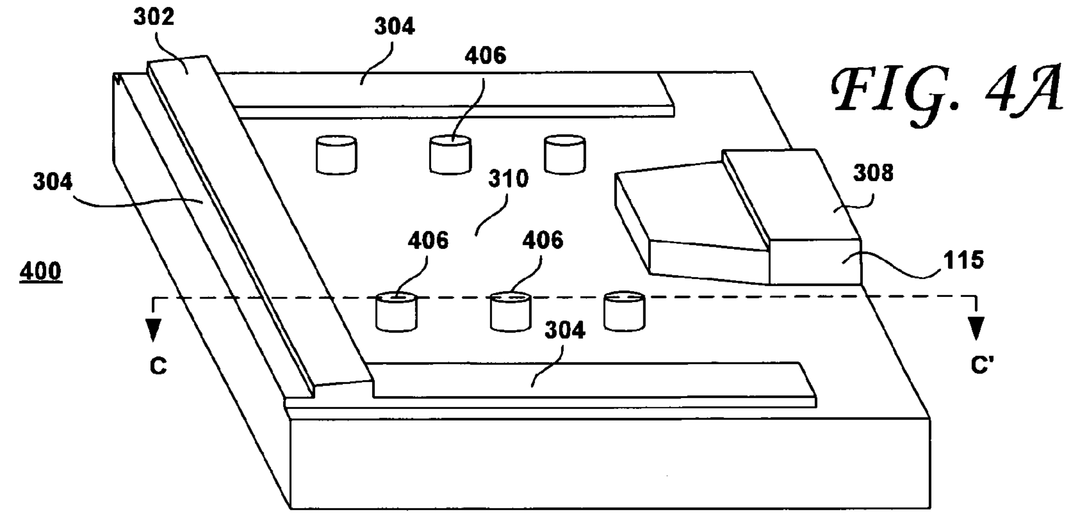
FIG. 4A is a representation of a slider according to another embodiment of the present invention.
Figure 4B:
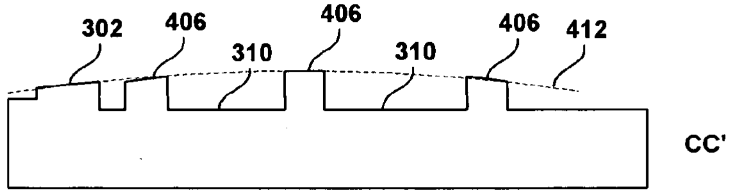
FIG. 4B is a cross-sectional view of the slider of FIG. 4A, taken along line CC'.

However, the insular regions of the air-bearing surface need not be bounded (or solely bounded) by the shallow etch region 304. FIG. 4A is a representation of a slider 400 according to a further embodiment of the present invention. FIG. 4B is a cross-sectional view of the slider 400 of FIG. 4A, taken along line CC'. As shown in FIGS. 4A and 4B, the insular regions 406 of the air-bearing surface may be bounded by the deep recessed surface 310. As best shown in FIG. 4B, the insular surfaces 406 and the leading air bearing surface 302 of the slider 400 are generally co-planar, but may collectively form a slight radius of curvature 412, whose radius is exaggerated in FIG. 4B for clarity of illustration.

Figure 5:
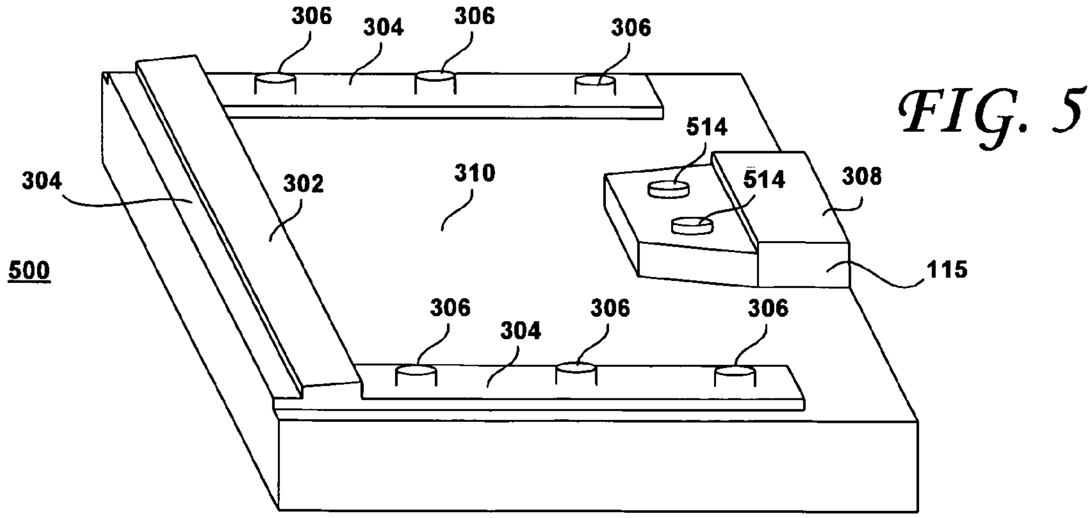
FIG. 5 is a representation of a slider according to still another embodiment of the present invention.

As shown in FIG. 5, which shows a still further embodiment of the slider according to the present invention, the air-bearing surface may also (i.e., in combination with the insular regions 306 and/or 406) include insular regions 514 bounded by the center pad 115. The insular regions 514 of the air-bearing surface may be substantially co-planar with the center pad region 308 of the air-bearing surface of the slider 500. Likewise, the insular regions 306, 406 of the sliders 300, 400 of FIGS. 3A through 4B may be substantially co-planar with the leading air-bearing region 302 and the center pad region 308 of the air-bearing surface of the sliders 300, 400. In contradistinction, the protuberances 106 of the conventional slider 100 of FIGS. 1A and 1B are not co-planar or substantially co-planar with the air-bearing surface 102, but protrude therefrom, with deleterious effects upon the performance of the slider.

As shown at 312 in FIG. 3B, the regions 302 and 306 (and/or 308) of the air-bearing surface of the slider 300 may collectively form a radius of curvature 312. The height differential between the insular regions 306 of the air bearing surface and the leading air bearing region 302 is preferably less than 4 micro inches. Similarly, as shown at 412 in FIG. 4B, the regions 302 and 406 (and/or 308) of the air-bearing surface of the slider 400 may also collectively form a radius of curvature 412. The height differential between the insular regions 406 of the air bearing surface and the leading air bearing region 302 is preferably less than 4 micro inches. Likewise, the leading air-bearing region 302, the insular regions 306 and 514 of FIG. 5 may collectively form a radius of curvature whose height differential is also less than 4 micro inches. A layer of diamond like carbon may be deposited on the insular regions 306, 406, 514, the leading air-bearing region 302, the shallow recessed surface 304 and/or on the deep recessed surface 310. The height differentials discussed above may, for example, be less than 2 micro inches. For example, the height differentials may be about 1 micro inch.

Each of the insular regions 306, 406, 514 of the air-bearing surfaces of the sliders 300, 400 and 500 are shaped and dimensioned so as to reduce stiction with the disk(s) 212, 211. For example, the insular regions 306, 406, 514 may be shaped as a circle or an ellipse, for example. According to the present invention, each of the insular regions 306, 406, 514 may have a surface area that is greater than 100 microns squared and less than 2000 microns squared.

Figure 7:
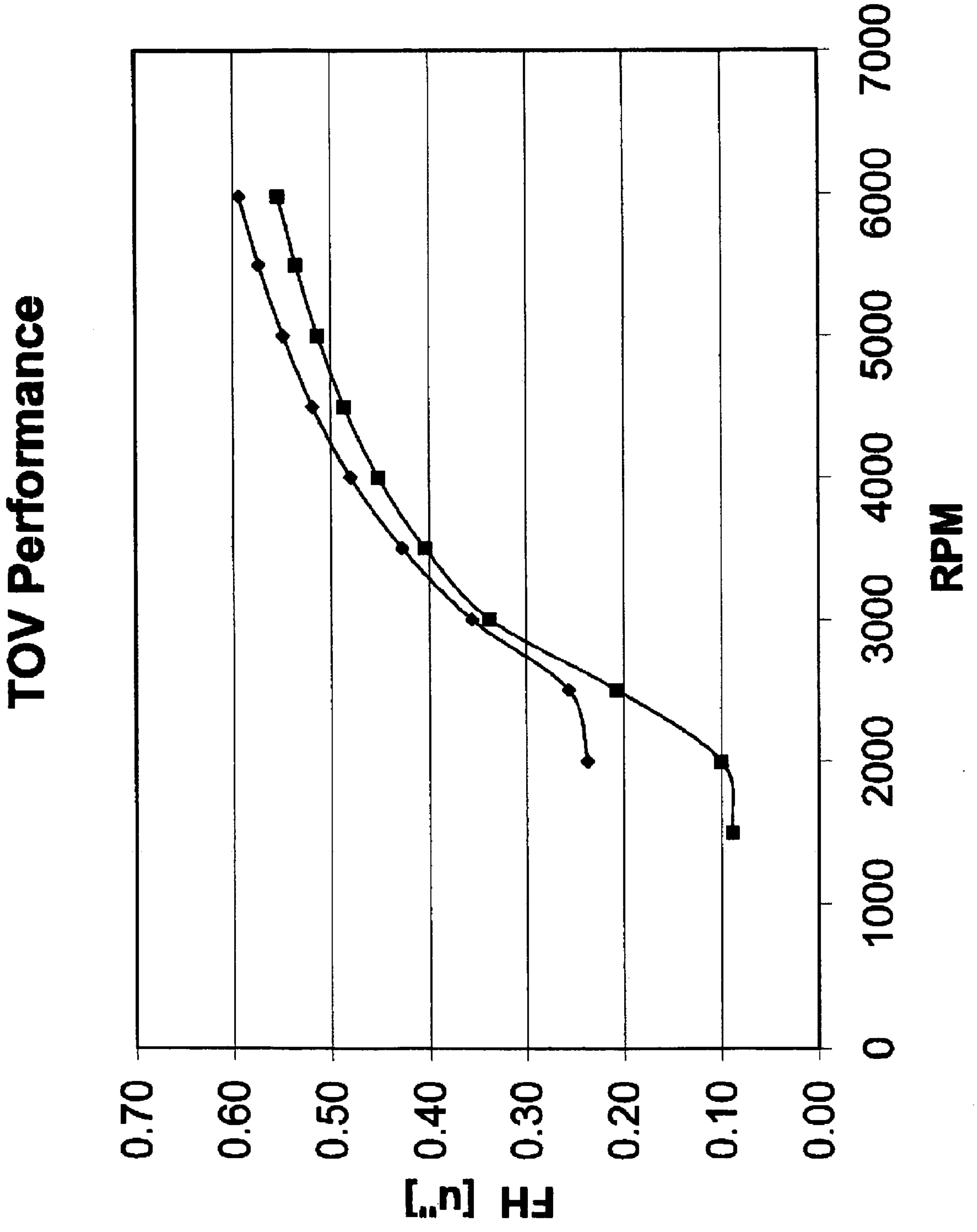
FIG. 7 is a graph showing the take off velocity (TOV) of a conventional slider, showing the flying height (FH) of the conventional slider above the disk versus revolutions per minute (RPM) of the disk, according to the prior art.

FIG. 7 is a graph showing the take off velocity (TOV) of a conventional slider (such as slider 100 in FIGS. 1A and 1B), showing the flying height (FH) of the conventional slider above the disk versus revolutions per minute (RPM) of the disk, according to the prior art. As shown therein, the conventional slider as shown in FIGS. 1A and 1B is able to fly about 0.2 micro inches (minimum flying height FH_min of the slider) to about 0.25 micro inches (nominal flying height FH_gap of the read/write transducers) above the surface of the disks when the disks are spinning at about 2000 RPM and fly at about 0.5 micro inches at about 4500 RPM. The protrusions 106 of FIGS. 1A and 1B protrude from the ABS 102 by about 35 nm. The relatively great height of such protrusions 106 above the ABS 102, in turn, conventionally necessitates a high flying pitch to enable the protrusions 106 to clear the surface of the disk.

Figure 8:
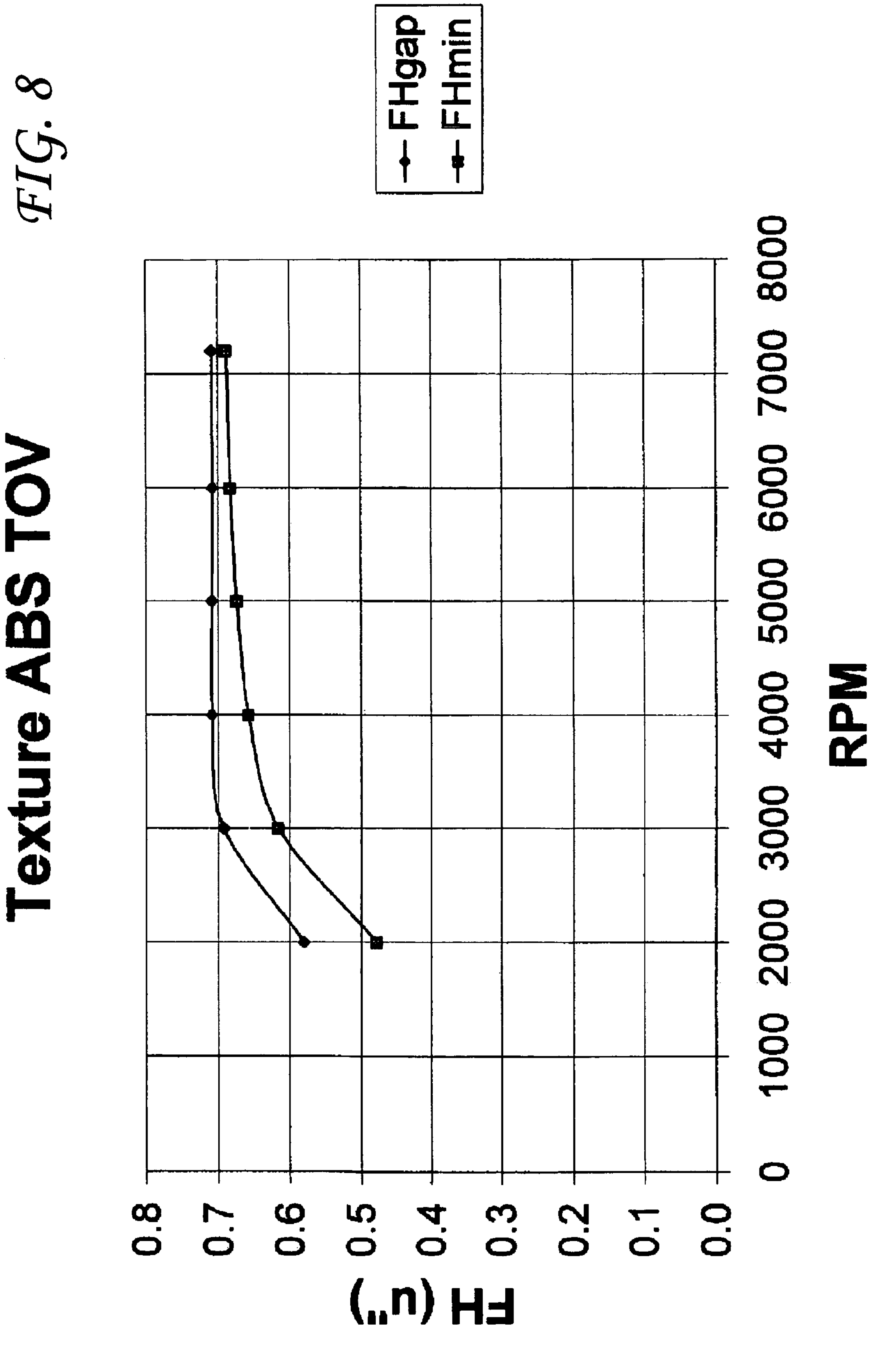
FIG. 8 is a graph showing the TOV of a slider according to the present invention.

FIG. 8 is a graph showing the TOV of a slider (such as shown at 300, 400 or 500) according to the present invention. According to the present invention and in contrast to the flying performance of conventional sliders shown in FIG. 7, the present slider 300, 400 and/or 500 may fly between about 0.47 micro inches (FHmin, or minimum flying height of the read/write transducers above the disk) and about 0.57 micro inches (FHgap, or nominal flying height of the slider above the disk) when the disk is spinning at about 2000 RPM and may fly at between about 0.65 and about 0.71 micro inches at about 4500 RPM. The present invention, therefore, enables a faster take off speed and enables the read/write transducers to fly above the disk at comparatively slower disk RPM. In turn, a faster take off speed causes less wear on the interface between the read/write transducers and the surface of the disk (such as the CSS area of a CSS drive, for example). In addition, as no surface of the present slider protrudes above the air-bearing surface, the take off angle of the slider can be shallower than the comparatively higher take off angle necessary in conventional sliders to clear the protrusions 106 from the disk surface. Moreover, as the present slider has a greater roll stiffness as compared with conventional sliders, the flying characteristics of the present slider are more stable than those of conventional sliders.

What is claimed is:

1. A head stack assembly for a disk drive having a disk, the head stack assembly comprising:

a body portion including a bore defining a pivot axis;

an actuator arm cantilevered from the body portion;

a head gimbal assembly supported at the actuator arm and including:

a load beam;

a gimbal coupled to the load beam, and a slider coupled to the gimbal and including a transducer for reading and writing on a recording surface of a disk, the slider including an air bearing surface that is selectively etched to form a shallow recessed surface and a deep recessed surface, the air bearing surface including a leading air bearing region and at least one insular region configured to reduce stiction with the disk, the leading air bearing region and the at least one insular region being substantially co-planar so as to define a single radius of curvature, the shallow recessed surface being disposed between the air bearing surface and the deep recessed surface.

2. The head stack assembly of claim 1, wherein the at least one insular region is bounded by the shallow recessed surface.

3. The head stack assembly of claim 1, wherein the at least one insular region is bounded by the deep recessed surface.

4. The head stack assembly of claim 1, wherein a height differential between the at least one insular region of the air bearing surface and the leading air bearing region is less than 4 micro inches.

5. The head stack assembly of claim 1, wherein the air-bearing surface is selectively etched to form a plurality of insular regions, each of the plurality of insular regions being shaped and dimensioned so as to reduce stiction with the disk.

6. The head stack assembly of claim 1, wherein the air-bearing surface further is selectively etched to form a center pad region disposed near a trailing edge of the slider.

7. The head stack assembly of claim 1, wherein the at least one insular region of the air bearing surface is shaped as one of a circle and an ellipse.

8. The head stack assembly of claim 1, wherein the at least one insular region has a surface area that is greater than 100 microns squared and less than 2000 microns squared.

9. The head stack assembly of claim 1, further including a layer of diamond like carbon deposited on at least one of the insular region, the leading air-bearing region, the shallow recessed surface and the deep recessed surface.

10. A disk drive, comprising:

a disk having a recording surface;

a head stack assembly, including:

a body portion including a bore defining a pivot axis;

an actuator arm cantilevered from the body portion, and a head gimbal assembly supported at the actuator arm and including:

a load beam;

a gimbal coupled to the load beam, and a slider coupled to the gimbal and including a transducer for reading and writing on the recording surface, the slider including an air bearing surface that is selectively etched to form a shallow recessed surface and a deep recessed surface, the air bearing surface including a leading air bearing region and at least one insular region configured to reduce stiction with the disk, the leading air bearing region and the at least one insular region being substantially co-planar so as to define a single radius of curvature, the shallow recessed surface being disposed between the air bearing surface and the deep recessed surface.

11. The disk drive of claim 10, wherein the at least one insular region is bounded by the shallow recessed surface.

12. The disk drive of claim 10, wherein the at least one insular region is bounded by the deep recessed surface.

13. The disk drive of claim 10, wherein a height differential between the at least one insular region of the air bearing surface and the leading air bearing region is less than 4 micro inches.

14. The disk drive of claim 10, wherein the air-bearing surface is selectively etched to form a plurality of insular regions, each of the plurality of insular regions being shaped and dimensioned so as to reduce stiction with the disk.

15. The disk drive of claim 10, wherein the air-bearing surface further is selectively etched to form a center pad region disposed near a trailing edge of the slider.

16. The disk drive of claim 10, wherein the at least one insular region of the air bearing surface is shaped as one of a circle and an ellipse.

17. The disk drive of claim 10, wherein the at least one insular region has a surface area that is greater than 100 microns squared and less than 2000 microns squared.

18. The disk drive of claim 10, further including a layer of diamond like carbon deposited on at least one of the insular region, the leading air-bearing region, the shallow recessed surface and the deep recessed surface.

19. A slider for a disk drive including a disk, the disk including a recording surface, the slider comprising:

a transducer for reading and writing on the recording surface, and an air bearing surface that is configured to form a shallow recessed surface and a deep recessed surface, the air bearing surface being selectively etched to form a leading air bearing region and at least one insular region configured to reduce stiction with the disk, the leading air bearing region and the at least one insular region being substantially co-planar so as to define a single radius of curvature, the shallow recessed surface being disposed between the air bearing surface and the deep recessed surface.

20. The slider of claim 19, wherein the at least one insular region is bounded by the shallow recessed surface.

21. The slider of claim 19, wherein the at least one insular region is bounded by the deep recessed surface.

22. The slider of claim 19, wherein a height differential between the at least one insular region of the air bearing surface and the leading air bearing region is less than 4 micro inches.

23. The slider of claim 19, wherein the air-bearing surface is selectively etched to form a plurality of insular regions, each of the plurality of insular regions being shaped and dimensioned so as to reduce stiction with the disk.

24. The slider of claim 19, wherein the air-bearing surface further is selectively etched to form a center pad region disposed near the trailing edge of the slider.

25. The slider of claim 19, wherein the at least one insular region of the air bearing surface is shaped as one of a circle and an ellipse.

26. The slider of claim 19, wherein the at least one insular region has a surface area that is greater than 100 microns squared and less than 2000 microns squared.

27. The slider of claim 19, further including a layer of diamond like carbon deposited on at least one of the insular region, the leading air-bearing region, the shallow recessed surface and the deep recessed surface.

* * * * *